United States Patent
Wu

(10) Patent No.: US 9,083,519 B2
(45) Date of Patent: Jul. 14, 2015

(54) SYSTEMS AND METHODS FOR ADAPTIVELY SELECTING A DECODING SCHEME TO DECODE EMBEDDED INFORMATION

(75) Inventor: Huaming Wu, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1191 days.

(21) Appl. No.: 12/040,694

(22) Filed: Feb. 29, 2008

(65) Prior Publication Data

US 2010/0002669 A1 Jan. 7, 2010

(51) Int. Cl.
*H04L 1/16* (2006.01)
*H04L 5/00* (2006.01)
*H04L 1/00* (2006.01)

(52) U.S. Cl.
CPC .......... *H04L 1/1671* (2013.01); *H04L 1/0046* (2013.01); *H04L 1/0079* (2013.01); *H04L 5/0053* (2013.01)

(58) Field of Classification Search
None
See application file for complete search history.

(56) References Cited

U.S. PATENT DOCUMENTS

| | | | | |
|---|---|---|---|---|
| 4,131,761 A | * | 12/1978 | Giusto | 370/527 |
| 5,014,276 A | * | 5/1991 | Bush et al. | 714/704 |
| 5,153,591 A | * | 10/1992 | Clark | 341/51 |
| 5,379,305 A | * | 1/1995 | Weng | 714/774 |
| 5,594,435 A | * | 1/1997 | Remillard | 341/51 |
| 5,959,560 A | * | 9/1999 | Said et al. | 341/107 |
| 6,370,671 B1 | * | 4/2002 | Pan et al. | 714/784 |
| 6,381,251 B1 | * | 4/2002 | Sano et al. | 370/480 |
| 6,516,435 B1 | * | 2/2003 | Tsunoda | 714/751 |
| 6,611,567 B1 | * | 8/2003 | Balakrishnan et al. | 375/298 |
| 6,611,794 B1 | * | 8/2003 | Fleming-Dahl | 702/191 |
| 6,804,309 B1 | * | 10/2004 | Morelos-Zaragoza | 375/316 |
| 7,253,814 B2 | | 8/2007 | Kim et al. | |
| 7,532,681 B2 | * | 5/2009 | Takeda et al. | 375/299 |
| 7,584,401 B2 | * | 9/2009 | Hong et al. | 714/755 |
| 7,586,834 B2 | * | 9/2009 | Byun et al. | 370/208 |
| 7,669,103 B2 | * | 2/2010 | Soljanin et al. | 714/751 |
| 2001/0033611 A1 | * | 10/2001 | Grimwood et al. | 375/219 |
| 2002/0108086 A1 | * | 8/2002 | Irvin et al. | 714/758 |
| 2002/0154618 A1 | * | 10/2002 | Kim et al. | 370/342 |
| 2003/0095532 A1 | * | 5/2003 | Kim et al. | 370/342 |
| 2003/0118240 A1 | * | 6/2003 | Satoh et al. | 382/239 |
| 2004/0071235 A1 | * | 4/2004 | Love et al. | 375/341 |

(Continued)

FOREIGN PATENT DOCUMENTS

| | | |
|---|---|---|
| CN | 1703035 | 11/2005 |
| CN | 1954573 | 4/2007 |

(Continued)

OTHER PUBLICATIONS

Google search report, Apr. 10, 2014, two pages.*

(Continued)

*Primary Examiner* — Alpus H Hsu
*Assistant Examiner* — Hooman Houshmand
(74) *Attorney, Agent, or Firm* — Austin Rapp & Hardman

(57) ABSTRACT

A method for selecting a decoding scheme to decode information is described. A codeword that represents at least a first message of a first information type and a second message of a second information type is received. A distribution pattern of symbols associated with the codeword is determined. The distribution pattern is compared to a threshold. A decoding scheme is selected based on the comparison.

18 Claims, 11 Drawing Sheets

(56) References Cited

U.S. PATENT DOCUMENTS

| | | | |
|---|---|---|---|
| 2005/0058341 A1 | 3/2005 | Maruoka | |
| 2005/0196037 A1 | 9/2005 | Muenzenmayer et al. | |
| 2005/0286402 A1* | 12/2005 | Byun et al. | 370/203 |
| 2006/0238827 A1 | 10/2006 | Ikeda et al. | |
| 2006/0286996 A1* | 12/2006 | Julian et al. | 455/522 |
| 2007/0041429 A1* | 2/2007 | Khandekar | 375/146 |
| 2007/0192663 A1* | 8/2007 | JiJina et al. | 714/752 |
| 2007/0260772 A1* | 11/2007 | Garmonov et al. | 710/33 |
| 2007/0261288 A1 | 11/2007 | Perry et al. | |
| 2007/0291048 A1 | 12/2007 | Kerofsky | |
| 2007/0291288 A1 | 12/2007 | Campbell et al. | |
| 2008/0019279 A1* | 1/2008 | Kim et al. | 370/241 |
| 2008/0025323 A1* | 1/2008 | Khan | 370/400 |
| 2008/0151938 A1* | 6/2008 | Yang et al. | 370/479 |
| 2008/0165873 A1* | 7/2008 | Ghosh et al. | 375/261 |
| 2008/0219370 A1* | 9/2008 | Onggosanusi et al. | 375/260 |
| 2008/0253318 A1* | 10/2008 | Malladi et al. | 370/328 |
| 2008/0305745 A1* | 12/2008 | Zhang et al. | 455/67.11 |
| 2010/0169758 A1* | 7/2010 | Thomsen | 715/212 |
| 2010/0177842 A1* | 7/2010 | Chang et al. | 375/295 |
| 2010/0211856 A1* | 8/2010 | Weingarten | 714/777 |

FOREIGN PATENT DOCUMENTS

| | | |
|---|---|---|
| JP | 02-179145 | 7/1990 |
| JP | 05-122163 | 5/1993 |
| JP | 11-234249 | 8/1999 |
| JP | 2002-278748 | 9/2002 |
| SU | 1651297 | 5/1991 |
| WO | 2005020519 | 3/2005 |
| WO | 2005/093703 | 10/2005 |
| WO | 2007/094156 | 8/2007 |

OTHER PUBLICATIONS

Motorola, "Uplink transmission of CQI and Ack/Nack," 3GPP TSG RAN1 meeting #49bis, Jun. 2007, 4 pages.
Qualcomm Europe, "Coding structure for CQI+ACK," 3GPP TSG RAN WG1 meeting #49bis, Jun. 2007, pp. 1-7.
NTT DoCoMo, "LS on target quality on L1/L2 control channel," 3GPP TSG WG1 meeting #48b, Mar. 2007, 1 page.
Sharp, "Improved Flexibility/Performance CQI+ACK/NACK Coding in the E-UTRA Uplink," R1-073321, Aug. 2007, 7 pages.
Texas Instruments, "Embedding ACK/NAK in CQI Reference Signals and Receiver Structures," R1-080190, Jan. 2008, 7 pages.
Nokia Siemens Networks, Nokia, "Performance of CQI+ACK/NACK Transmission on PUSCH," 3GPP TSG RAN WG1 Meeting #49bis, R1-073003, Jun. 2007.
Office Action issued for Japanese Patent Application No. JP 2009-553859 on Nov. 15, 2011.
Decision of Grant issued for Russian Patent Application No. RU 2010111745/08(016530) on Jan. 13, 2012.
Office Action issued for Japanese Patent Application No. JP 2010-532131 on Dec. 4, 2012.
Sharp, "Embedded Coding for PUCCH Transmissions of CQI+ACK/NACK," 3GPP TSG-RAN WG1 #50bis, R1-074656, Nov. 2007.
Texas Instruments, "Embedding ACK/NACK in CQI Reference Signals and Receiver Structures," 3GPP TSG-RAN WG#51bis, R1-080190, Jan. 2008.
Office Action issued Oct. 15, 2012 for Chinese Patent Application No. 200980106512.3.

* cited by examiner

SYSTEMS AND METHODS FOR ADAPTIVELY SELECTING A DECODING SCHEME TO DECODE EMBEDDED INFORMATION

CROSS-REFERENCE TO RELATED APPLICATIONS

This application is related to U.S. patent application Ser. No. 11/768,789 entitled "Systems and Methods for Embedding a First Signal in the Coding of a Second Signal," which was filed on Jun. 26, 2007.

TECHNICAL FIELD

The present invention relates generally to wireless communications and wireless communications-related technology. More specifically, the present invention relates to systems and methods for adaptively selecting a decoding scheme to decode embedded information.

BACKGROUND

A wireless communication system typically includes a base station in wireless communication with a plurality of user devices (which may also be referred to as user equipment, mobile stations, subscriber units, access terminals, etc.). The base station transmits data to the user devices over a radio frequency (RF) communication channel. The terms "downlink" and "forward link" refer to transmission from a base station to a user device, while the terms "uplink" and "reverse link" refer to transmission from a user device to a base station.

The 3rd Generation Partnership Project (3GPP) is a collaboration of standards organizations throughout the world. The goal of 3GPP is to make a globally applicable third generation (3G) mobile phone system specification within the scope of the IMT-2000 (International Mobile Telecommunications-2000) standard as defined by the International Telecommunication Union. The 3GPP Long Term Evolution ("LTE") Committee is considering Orthogonal Frequency Division Multiplexing (OFDM) as well as OFDM/OQAM (Orthogonal Frequency Division Multiplexing/Offset Quadrature Amplitude Modulation), as a method for downlink transmission, as well as OFDM transmission on the uplink.

Wireless communications systems (e.g., Time Division Multiple Access (TDMA), OFDM, Code Division Multiple Access (CDMA), Frequency Division Multiple Access (FDMA), etc.) usually calculate an estimation of a channel impulse response between the antennas of a user device and the antennas of a base station for coherent receiving. Channel estimation may involve transmitting known reference signals that are multiplexed with the data. Reference signals may include a single frequency and are transmitted over the communication systems for supervisory, control, equalization, continuity, synchronization, etc.

Wireless communication systems may include one or more mobile stations and one or more base stations that each transmits a reference signal. In addition, wireless communication systems may transmit control signals such as a channel quality indicator signal (CQI), acknowledgment signals (ACK) and negative acknowledgment signals (NACK). The control signals may be coded jointly or separately. However, performance may diminish and/or the acceptable error rates may increase if the control signals are jointly or separately coded. As such, benefits may be realized embedding one control signal in the coding of a second control signal. Decoding schemes do not exist that properly decode a second control signal with a first control signal embedded in the coding of the second signal. As such, benefits may be realized by providing systems and methods for adaptively selecting a decoding scheme that properly decode a second signal of one type and a first signal of another type, where the first signal is embedded in the coding of the second signal.

DETAILED DESCRIPTION

Figure 1:
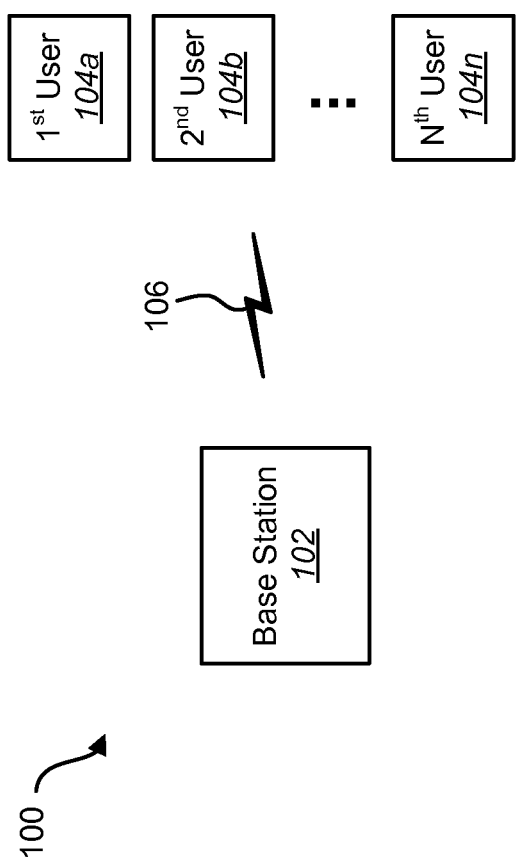
FIG. 1 illustrates an exemplary wireless communication system in which the present systems and methods may be practiced.

A method for selecting a decoding scheme to decode information is described. A codeword that represents at least a first message of a first information type and a second message of a second information type is received. A distribution pattern of symbols associated with the codeword is determined. The distribution pattern is compared to a threshold. A decoding scheme is selected based on the comparison.

In one example, the first message and the second message are decoded using the selected decoding scheme. The first message is embedded in the coding of the second message. A plurality of codebooks may be combined into a single codebook associated with the second information type. The single codebook may be searched for a decoding codeword. The second message may be decoded using the decoding codeword. A distribution pattern of symbols associated with the decoding codeword may be determined. The first message may be decoded based on the distribution pattern.

The first message may be decoded based on the distribution pattern of the symbols. A codebook associated with the second information type may be generated based on the decoded first message. The codebook may be searched for a decoding codeword. The second message may be decoded using the decoding codeword.

A determination may be made if more than one symbol has a greatest number of occurrences. If more than one symbol has a greatest number of occurrences, a plurality of codebooks associated with the second information type may be combined into a single codebook. The plurality of codebooks may equal the number of symbols that have the greatest number of occurrences. The single codebook may be searched for a decoding codeword. The second message may be decoded using the decoding codeword. The first message may be decoded based on a distribution pattern of symbols associated with the decoding codeword.

The first information type and the second information type may be control signals. The first information type may be an acknowledgement/non-acknowledgement (ACK/NACK). The second information type may be a channel quality indicator (CQI).

A communications device that is configured to select a decoding scheme to decode information is also described. The communications device includes a processor and memory in electronic communication with the processor. Instructions are stored in the memory. The instructions are executable to receive a codeword that represents at least a first message of a first information type and a second message of a second information type. The instructions are further executable to determine a distribution pattern of symbols associated with the codeword and compare the distribution pattern to a threshold. The instructions are also executable to select a decoding scheme based on the comparison.

A computer-readable medium including executable instructions is also described. The instructions are executable for receiving a codeword that represents at least a first message of a first information type and a second message of a second information type. The instructions are further executable for determining a distribution pattern of symbols associated with the codeword and comparing the distribution pattern to a threshold. The instructions are also executable for selecting a decoding scheme based on the comparison.

A communications device that is configured to select a decoding scheme to decode information is also described. The communications device includes means for receiving a codeword that represents at least a first message of a first information type and a second message of a second information type. The device also includes means for determining a distribution pattern of symbols associated with the codeword and means for comparing the distribution pattern to a threshold. The device further includes means for selecting a decoding scheme based on the comparison.

The present systems and methods describe an adaptive method of decoding multiple types of information. In one example, a first message of a first information type is embedded in the coding of a second message of a second information type. For example, the first message may be embedded in the codeword that is used to encode the second message.

As used herein, the term "information type" refers to a type of signal that may be transmitted and/or received. The term "message" refers to the string of bits for each information type. Examples of information type may include a channel quality indicator (CQI), an acknowledgment/non-acknowledgment (ACK/NACK), a pre-coding matrix indicator (PMI), etc. The present systems and methods may be implemented for additional types of information as well.

The desired quality for each of the multiple types of information may be different. In one example, the desired quality is a function of a message error rate and delay. Examples of different information types include channel quality indicator (CQI) information and acknowledgment/non-acknowledgment (ACK/NACK) information. Table 1 illustrates an example of desired target quality for CQI information and acknowledgment/non-acknowledgment ACK/NACK information.

TABLE 1

Target Quality for two types of information

| Event | Target Quality |
| --- | --- |
| NACK to ACK error | $10^{-4}$ |
| CQI block error rate | $10^{-2} - 10^{-1}$ |

Typically, each message of different types of information are encoded separately and multiplexed in a Time Division Multiplex (TDM) fashion. Following the example above, the message for CQI information and the message for ACK/NACK information may be placed in different time slots of a sequence. An advantage of this typical approach is greater control of the CQI and the ACK/NACK target qualities. However, coding these messages separately may cause a communications link to perform worse than a communications link that includes joint coding of the CQI and the ACK/NACK.

Jointly coding messages for multiple types of information involves multiplexing the messages together as a single type of information. An advantage of jointly coding is an improvement in performance. However, each type of message may have the same error target quality, which may not be desired. In other words, channel resources may be used inefficiently by overprotecting messages of one or more types of information. Conversely, insufficient channel resources may be used resulting in under protection of messages of one or more of the types of information.

Embedding a message for one type of information into the coding of a message for another type of information provides unequal error protection to each of the information types. In one example, embedded coding is implemented in the design of uplink control signaling in a cellular system. The present systems and methods provide an adaptive algorithm of decoding multiple types of information which are embedded together to achieve unequal error protection.

FIG. 1 illustrates an exemplary wireless communication system 100 in which the present systems and methods may be practiced. A base station 102 is in wireless communication with a plurality of user devices 104 (which may also be referred to as user equipment, mobile stations, subscriber units, access terminals, etc.). A first user device 104a, a second user device 104b, and an Nth user device 104n are shown in FIG. 1. The base station 102 transmits data to the user devices 104 over a radio frequency (RF) communication channel 106.

As used herein, the term "transmitter" refers to any component or device that transmits signals. A transmitter may be implemented in a base station 102 that transmits signals to one or more user devices 104. Alternatively, a transmitter may be implemented in a user device 104 that transmits signals to one or more base stations 102.

The term "receiver" refers to any component or device that receives signals. A receiver may be implemented in a user device 104 that receives signals from one or more base stations 102. Alternatively, a receiver may be implemented in a base station 102 that receives signals from one or more user devices 104.

The communications system 100 may be an Orthogonal Frequency Division Multiplexing (OFDM) system. In addition, the system 100 may be a Code Division Multiple Access (CDMA) system, a Time Division Multiple Access (TDMA) system, a Frequency Division Multiple Access (FDMA) system, a Wideband Code Division Multiple Access (W-CDMA) system, etc.

Figure 2:
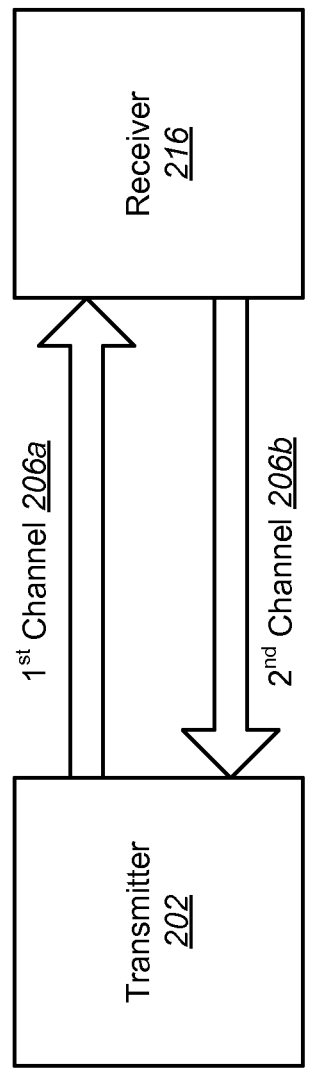
FIG. 2 illustrates communication channels that may exist between a transmitter and a receiver according to an example of the present systems and methods.

FIG. 2 illustrates communication channels 206 that may exist between a transmitter 202 and a receiver 216. As shown, communication from the transmitter 202 to the receiver 216 may occur over a first communication channel 206a. Communication from the receiver 216 to the transmitter 202 may occur over a second communication channel 206b.

The first communication channel 206a and the second communication channel 206b may be separate communication channels 206. For example, there may be no overlap between the transmission band of the first communication channel 206a and the transmission band of the second communication channel 206b. The first communication channel 206a may also be referred to as a downlink, forward link, etc. The second communication channel 206b may be referred to as an uplink, reverse link, etc.

Figure 3:
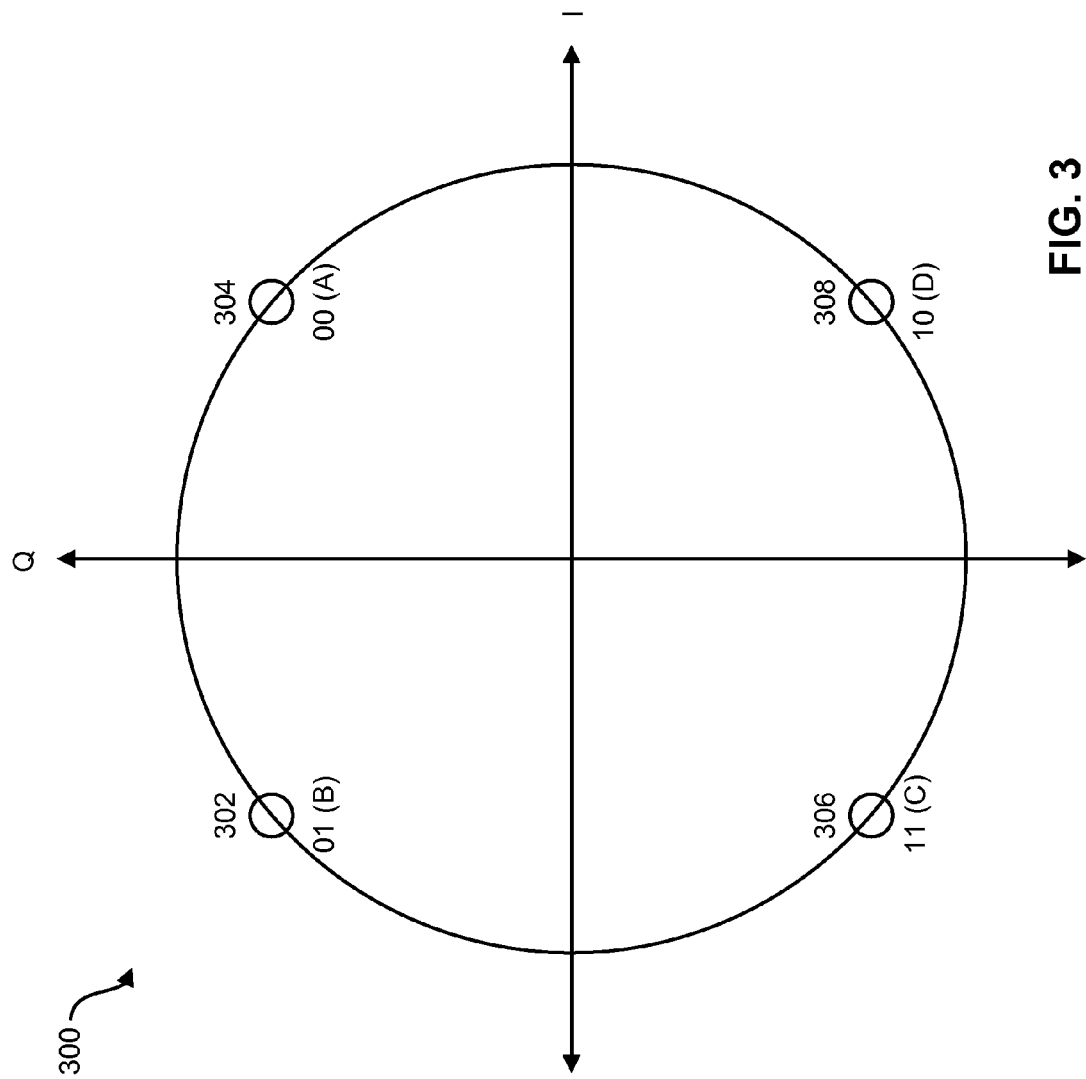
FIG. 3 is one embodiment of a constellation diagram for Quadrature Phase Shift Keying (QPSK) modulation.

FIG. 3 is one embodiment of a constellation diagram 300 for Quadrature Phase Shift Keying (QPSK) modulation, which may be implemented with the present systems and methods. QPSK modulation may use four points 302, 304, 306, 308 on the constellation diagram 300, equispaced around a circle. With four points 302, 304, 306 and 308, QPSK modulation may encode two bits of a message into a symbol. For example, a message may include the bits "01". These bits may be encoded as the symbol "B". In a similar manner, the bits "00" may be encoded as the symbol "A", the bits "11" may be encoded as the symbol "C" and the bits "10" may be encoded as the symbol "D".

Figure 4:
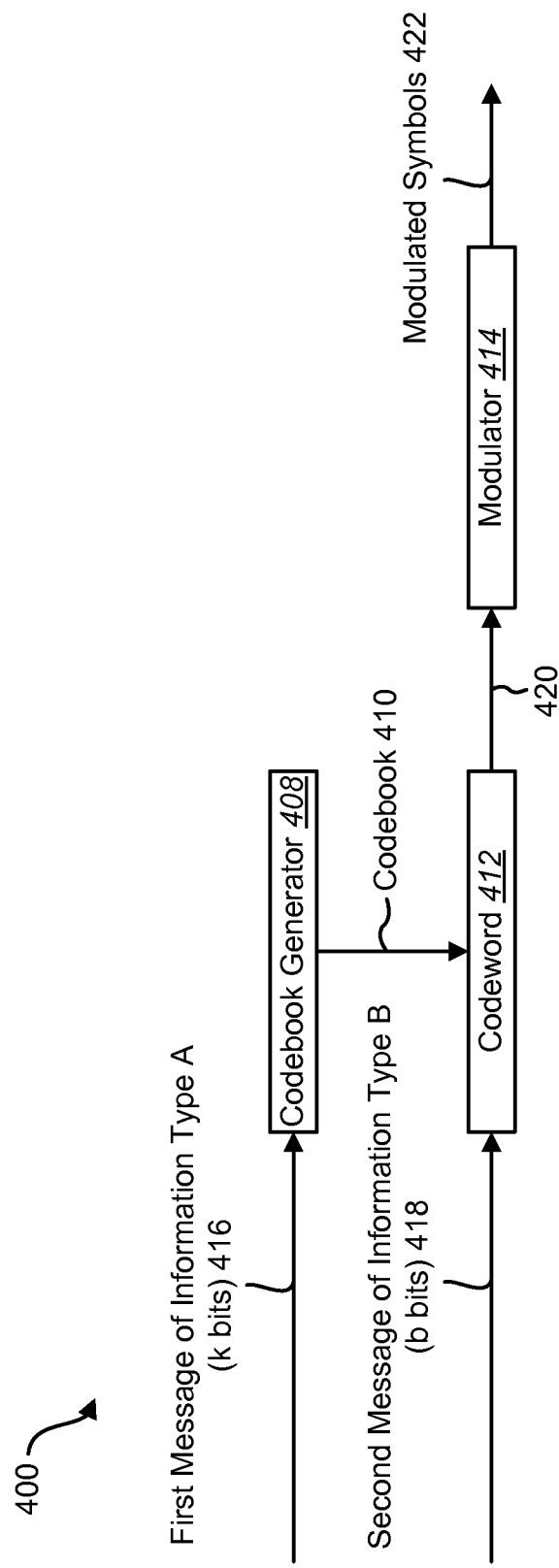
FIG. 4 is a flow diagram illustrating one configuration of a method for embedding a first message within the coding of a second message.

FIG. 4 is an example of a method 400 for embedding a first message of information type A 416 into the coding of a second message of information type B 418. The method 400 may be implemented on a user device 104. The first message 416 may include k bits and the second message 418 may include b bits.

In one example, information type A may be an ACK/NACK. If information type A is an ACK/NAK, k may equal two. As such, the first message 416 may be "00", "01", "10" or "11". In one configuration, information type B may be a CQI. As such, the number of bits (b) of the second message 418 may be eight.

A codebook generator 408 may generate a codebook 410 associated with information type B. The codebook 410 may be generated based on the first message 416. As used herein, the term "codebook" refers to a set of codewords which may be in the form of a lookup table. Each codeword corresponds to one message and may be used to encode the message. A first codebook with a first set of codewords may be generated if the first message 416 is "00". A second codebook with a second set of codewords may be generated if the first message 416 is "01", etc. The codeword 412 may be an m bit codeword. In one example, the codeword 412 is a 20-bit codeword.

In one example, an encoded second message 420 (i.e., the codeword 412) may be modulated by a modulator 414 to become n modulated symbols 422, where n depends on the modulation scheme used. In one configuration, the modulated symbols 422 are produced from the QPSK modulation scheme. The symbols 422 may be a combination of the symbols A 304, B 302, C 306 and D 308 from FIG. 3. The modulated symbols 422 may be inserted into time slots of a sequence and transmitted to a receiver.

The following example further illustrates the method 400 for embedding a first message 416 (such as an ACK/NACK) into the coding of a second message 418 (such as a CQI). The first message 416 may have the value of "00". The second message 418 may have the value of "00000000". The codebook generator 408 generates a codebook 410 associated with CQI information that is based on the value of the first message 416. The generated codebook 410 may include $2^b$ codewords. For example, if the number of bits (b) of the second message 418 is eight, the codebook 410 may include 256 codewords. One of the $2^b$ codewords is selected to encode the second message 418. The encoded second message 420 (i.e., the codeword 412) is modulated by a modulator 414 to become the modulated symbols 422.

Because the value of the first message 416 in this example is "00", the generated codebook 410 may include codewords that produce the A symbol 304 more than the other symbols after modulation. In other words, based on the QPSK constellation diagram 300, the modulated symbols 422 include more occurrences of the A 304 symbol than any other symbol. To further explain, codewords within the codebook 410 may include more occurrences of the combination "00" than the combinations "01", "10", or "11". When a codeword is modulated, the combinations "00" may be represented by the A 304 symbol. The combinations "01", "10" and "11" may be represented by the B 302 symbol, the D 308 symbol and the C 306 symbol, respectively. Table 2 shows an example of a codebook 410 that may be used to encode the second message 418 (such as the CQI) when the first message 416 (such as the ACK/NACK) has the value "00".

TABLE 2

Example codebook when first message is "00"

| Second Message (b bits) | Codeword (m bits) | Distribution of Symbols |
|---|---|---|
| 00000000 | 00000000000000011110 | AAAAAAABCD |
| ... | ... | ... |
| 11111111 | 10000000000001110000 | DAAAAABCAA |

In a similar manner, a codebook may be generated when the first message 416 is "01", "11" or "10". These codebooks may include codewords that produce more occurrences of the B 302 symbol, the C 306 symbol or the D 308 symbol after modulation. Table 3 shows an example of how the modulated symbols 422 may be distributed depending on the value of the first message 416.

TABLE 3

Examples of Symbol Distributions

| First Message (k bits) | Distribution of Symbols |
|---|---|
| 00 | 7A, 1B, 1C, 1D |
| 01 | 1A, 7B, 1C, 1D |
| 11 | 1A, 1B, 7C, 1D |
| 10 | 1A, 1B, 1C, 7D |

Modulated symbols 422 that represent types of information that are embedded in the coding of other types of information cannot be decoded by traditional decoding schemes. Traditional decoding schemes may use symbols to decode message for only one type of information. Examples of typical decoding schemes that are used to decode only one type of information include Maximum A Posteriori (MAP) decoding, Maximum Likelihood (ML) decoding and Minimum Distance decoding. A brief explanation of each type of traditional decoding scheme is provided below.

Given a received codeword x, the MAP decoding scheme selects a codeword y that will maximize P (y sent|x received). In other words, the codeword y is the codeword that is most likely to be received as the codeword x.

Given a received codeword x, the ML decoding scheme selects a codeword y to maximize P (x received|y sent). In other words, the codeword y is the codeword that is most likely to have been sent, given that the codeword x was received.

Given a received codeword x, the Minimum Distance decoding scheme selects a codeword y to minimize the Hamming (or Euclidean) distance between x and y. In other words, the codeword y is the codeword that is as close as possible to the codeword x.

Figure 5:
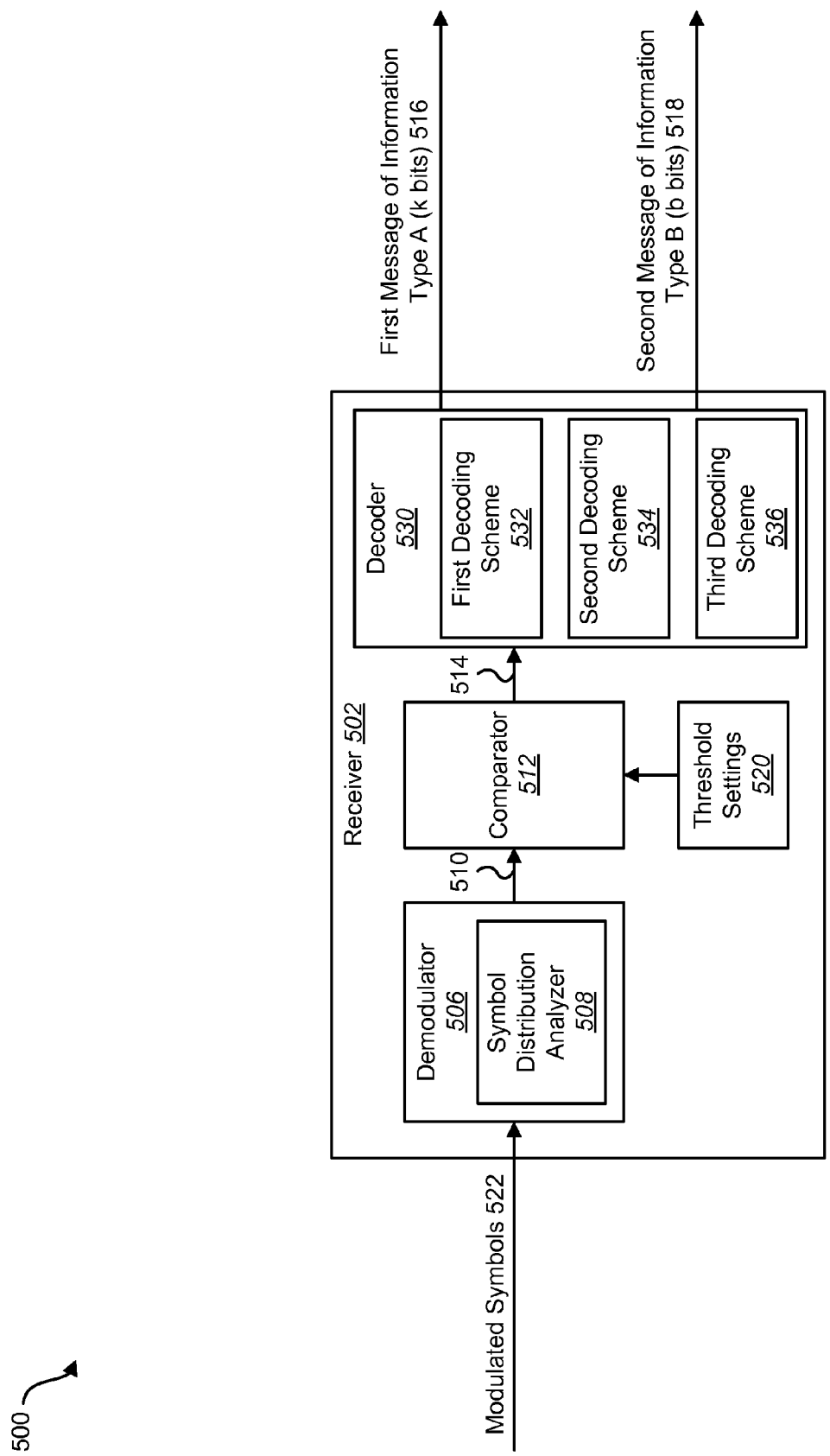
FIG. 5 is a block diagram illustrating one example of a receiver that decodes the first message and the second message based on a decoding scheme.

FIG. 5 is a block diagram illustrating one configuration 500 of a receiver 502 for decoding a first message 516 and a second message 518. The first message 516 may be of information type A and the second message 518 may be of information type B. In one example, the first message 516 is embedding in the coding of the second message 518 as previously explained. In one configuration, the first message 516 may be one of four possibilities: "00", "01", "11" and "10". As such, one of four corresponding codebooks of information type B may be used to decode the first and second message 516, 518. The provided codebook depends on the value of the first message 516. The four possible codebooks may be denoted as $S_{00}$, $S_{01}$, $S_{11}$ and $S_{10}$.

Each of the codebooks includes codewords that are used to decode the second message 518. The codeword may be associated with n symbols. The distribution of the n symbols depends on the value of the first message 516. For example, if QPSK modulation is used, if the first message 516 is "00", the distribution of the n symbols may include more occurrences of the A symbol 304. In one example, $N_1$, $N_2$, $N_3$ and $N_4$ represent the number of occurrences of each symbol in descending order. In other words, counting the occurrences of the A symbol, the B symbol, the C symbol and the D symbol and sorting them in descending order yields $N1 \geq N2 \geq N3 \geq N4$.

In one configuration, the receiver 502 is a base station 102. In another example, the receiver 502 is a user device 104. A demodulator 506 may receive modulated symbols 522. The modulated symbols 522 may represent the first message 516 and the second message 518. The demodulator 506 may include a symbol distribution analyzer 508. The analyzer 508 determines the distribution of the modulated symbols 522. For example, if the modulated symbols 522 were modulated using QPSK modulation, the analyzer 508 determines the number of A symbols, B symbols, C symbols and D symbols included in the modulated symbols 522.

The determined distribution 510 of the symbols may be received by a comparator 512. The comparator 512 may compare the quantity of each symbol to one or more threshold settings 520. The comparison results 514 may be passed to a decoder 530. The decoder 530 may decode the modulated symbols 522 in order to produce the first message 516 and the second message 518. In one example, the decoder 530 uses either a first decoding scheme 532, a second decoding scheme 534 or a third decoding scheme 536 to decode the first and second message 516, 518. The decoder 530 may determine which scheme to implement based on the comparison results 514 provided by the comparator 512.

In one example, the threshold settings 520 indicate which decoding scheme to use. Some example threshold settings 520 may include the first decoding scheme 532 being used if $N_1=N_2=N_3=N_4$. The second decoding scheme 534 may be used if $N_1>N_2$. The third decoding scheme 536 may be used if $N_1=N_2$ or $N_1=N_2=N_3$. Additional threshold settings 520 may include using the first decoding scheme 532 if $N_1=N_2=N_3=N_4$ or if $N_1=N_2=N_3$ and $N_3-N_4 \leq 1$. The second decoding scheme 534 may be used if $N_1-N_2>1$. The third decoding scheme 536 may be used for other cases. Of course, the threshold settings 520 provided above are examples. Other settings 520 may be used.

Figure 6:
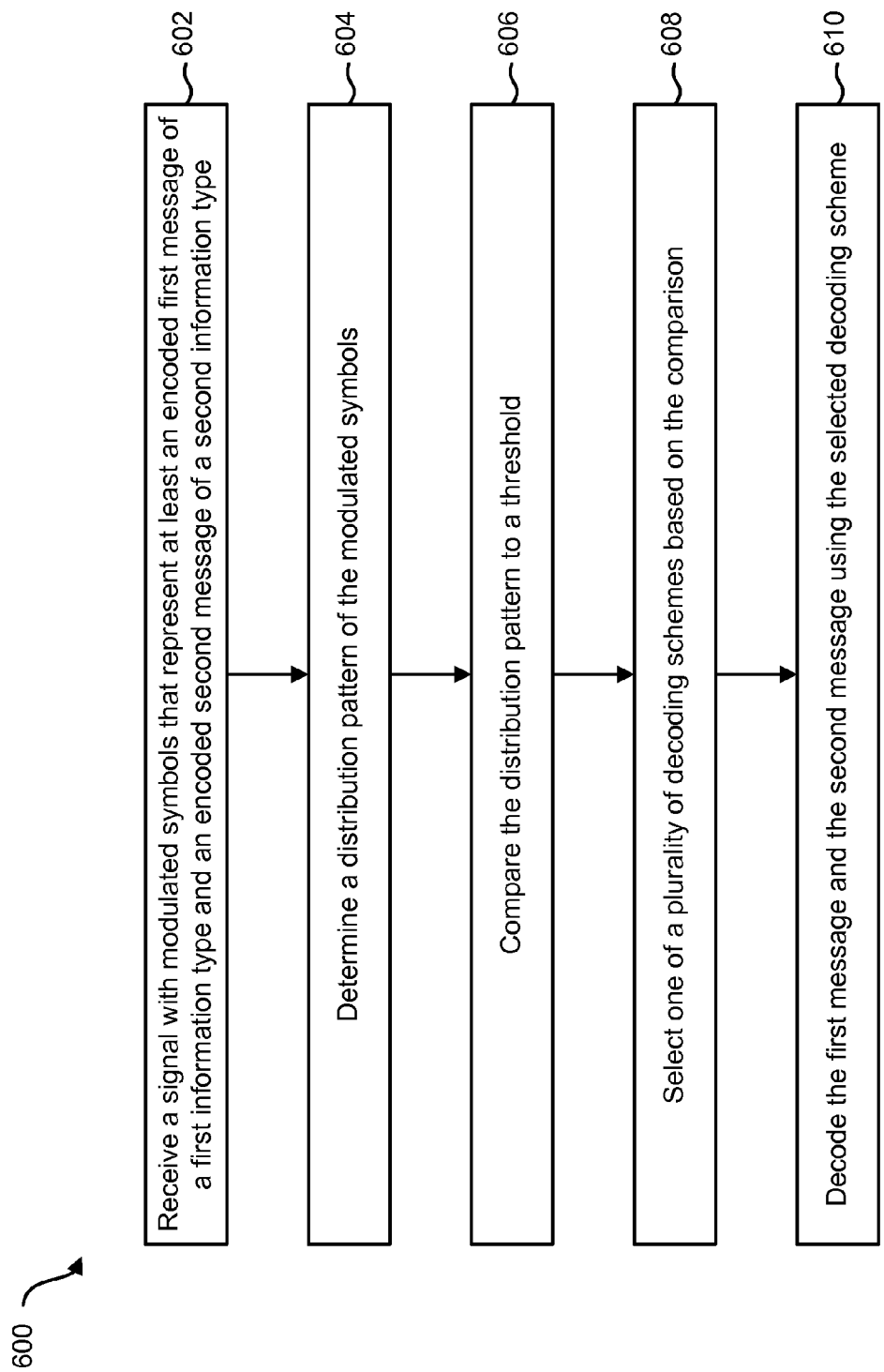
FIG. 6 is a flow diagram illustrating a method for selecting a decoding scheme to decode at least a first message and a second message of different types.

FIG. 6 is a flow diagram illustrating a method 600 for selecting a decoding scheme to decode at least a first message and a second message that convey different types of information. The method 600 may be implemented by a base station 102. In another example, the method 600 may be implemented by a user device 104.

In one example, a signal is received 602 with modulated symbols. The symbols may represent at least an encoded first message of a first information type and an encoded second message of a second information type. In one configuration, the first message is embedded in the encoding of the second message. A distribution pattern of the modulated symbols may be determined 604. The distribution pattern may indicate the number of occurrences of each symbol. In one configuration, the distribution pattern of the symbols may be compared 606 to a threshold setting. One of a plurality of decoding schemes may be selected 608 based on the comparison of the distribution pattern and the threshold setting. The selected decoding scheme may be use to decode 610 the first message and the second message.

Figure 7:
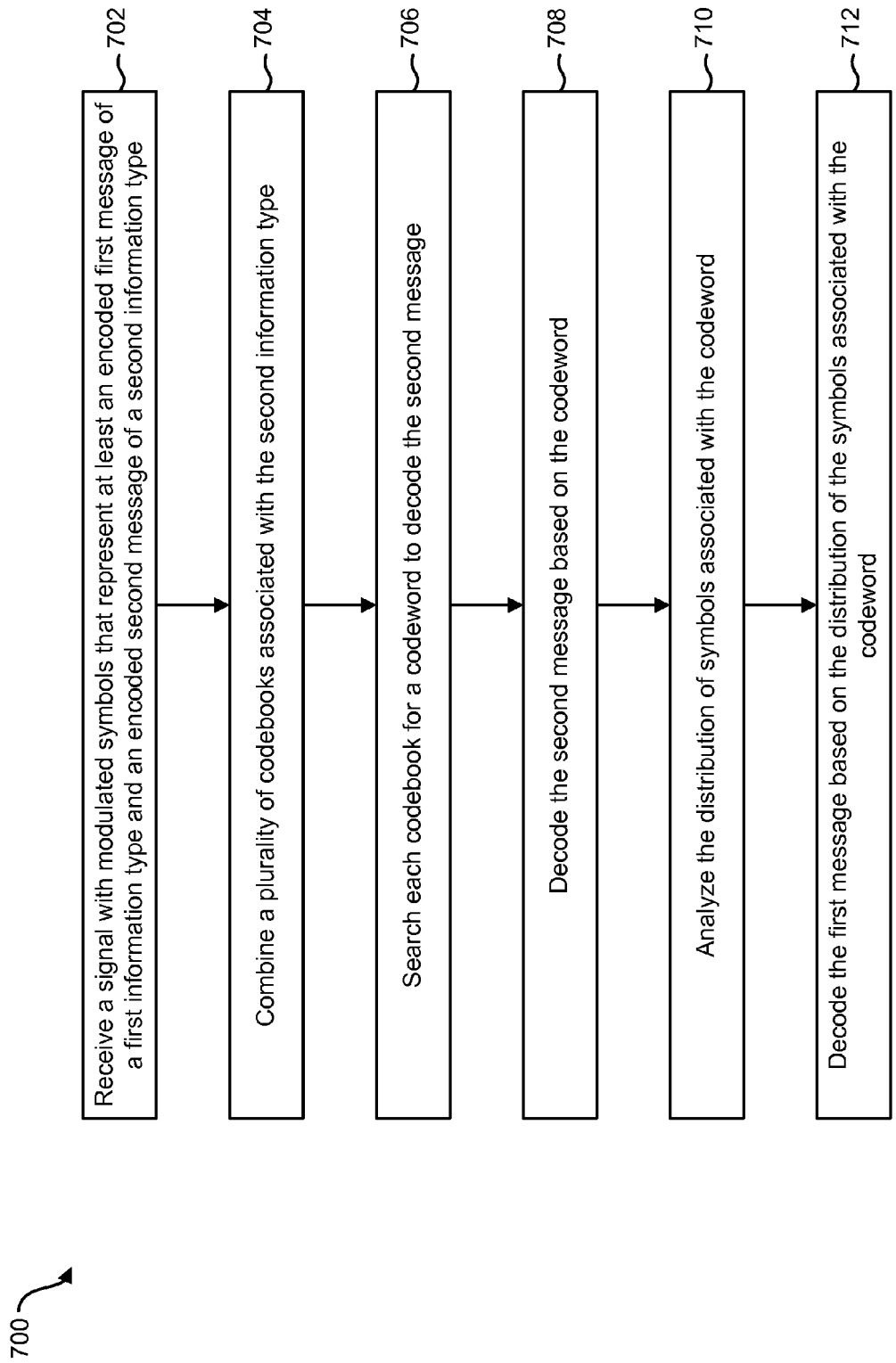
FIG. 7 is a flow diagram illustrating one example of a method for using a first decoding scheme to decode at least a first message and a second message that represent different types of information.

FIG. 7 is a flow diagram illustrating one example of a method 700 for using a first decoding scheme 532 to decode at least a first message and a second message that represent different types of information. The method 700 may be implemented by a base station 102. In another example, the method 700 may be implemented by a user device 104.

A signal may be received 702 with modulated symbols. The modulated symbols may represent at least an encoded first message of a first information type and an encoded second message of a second information type. As previously explained, the first message may be embedded in the coding of the second message. The symbols may be interpreted as a codeword x. For example, a signal may be received 702 with the modulated symbols "7A 1B 1C 1D". The corresponding codeword for such symbols may be "0000000000000011110".

In one configuration, a plurality of codebooks are combined 704. The codebooks may be codebooks associated with the second information type. For example, the codebooks $S_{00}$, $S_{01}$, $S_{11}$ and $S_{10}$ may be combined into a codebook S. The codebook S may include codewords that may be used to decode the second message of the second information type.

In one configuration, each codebook may be searched 706 for a codeword that may be used to decode the second message. In other words, the codeword x may be decoded as if it included one type of information. The codeword x may be decoded using the above mentioned MAP or ML decoding scheme. Each codeword in the codebook S may be searched 706 to find a codeword y to decode the second message. In one example, the second message is decoded 708 based on the codeword.

The selected codeword may be associated with a plurality of symbols. In one configuration, the distribution of the symbols associated with the codeword are analyzed 710. In other words, the distribution of the symbols associated with the codeword y may be analyzed 710. The symbols may be similar to the symbols corresponding to QPSK modulation. The first message may be decoded 712 based on the distribution of the symbols associated with the codeword. For example, if the distribution of the symbols is "1A 7B 1C 1D", the first message may be decoded as "01".

Figure 8:
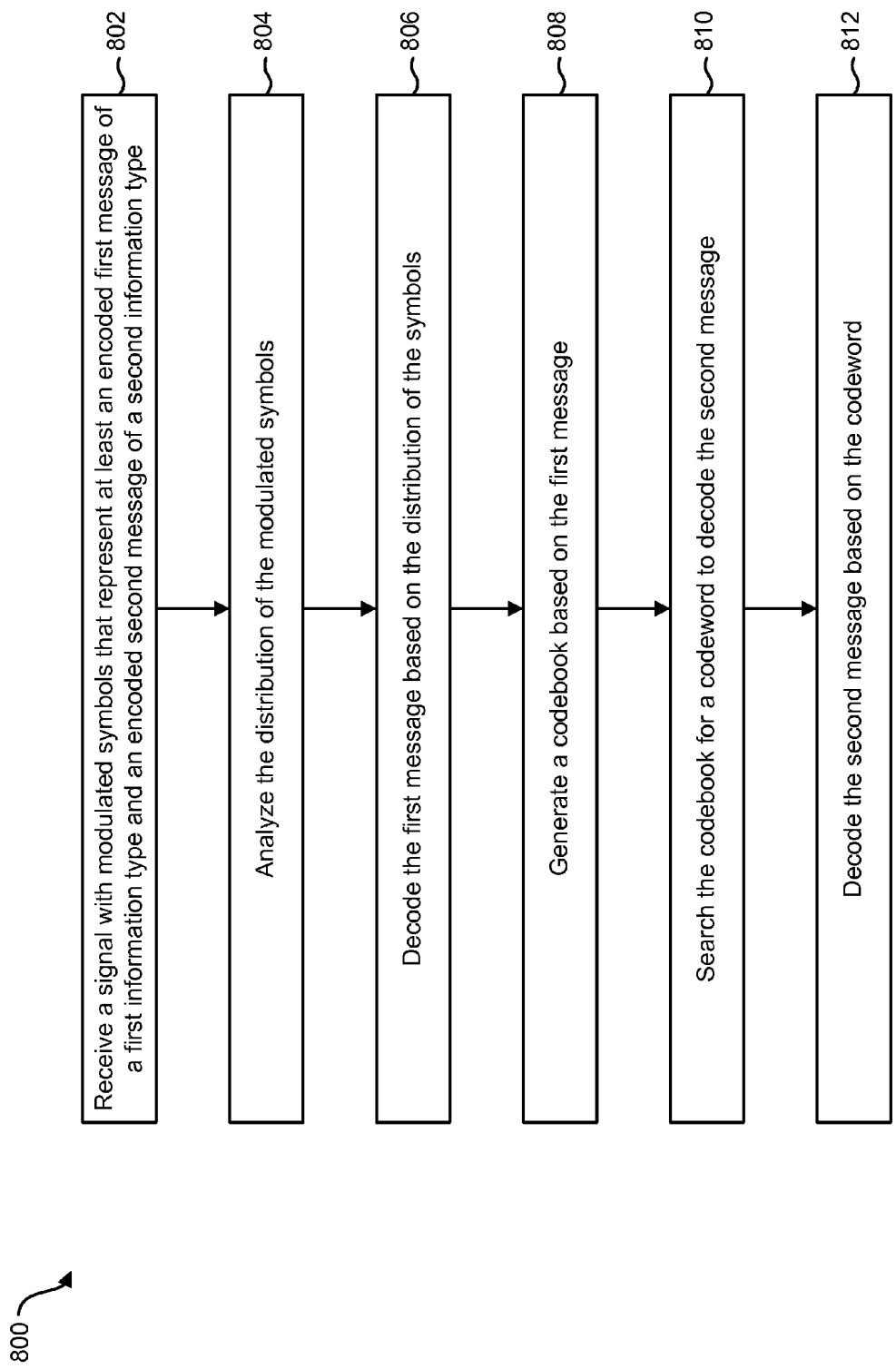
FIG. 8 is a flow diagram illustrating one example of a method for using a second decoding scheme to decode at least a first message and a second message that represent different types of information.

FIG. 8 is a flow diagram illustrating one example of a method 800 for using a second decoding scheme 534 to decode at least a first message and a second message that represent different types of information. The method 800 may be implemented by a base station 102. In another example, the method 800 may be implemented by a user device 104.

A signal may be received 802 with modulated symbols. The modulated symbols may represent at least an encoded first message of a first information type and an encoded second message of a second information type. As previously explained, the first message may be embedded in the coding of the second message. The symbols may be interpreted as a codeword x. For example, a signal may be received 802 with the modulated symbols "7A 1B 1C 1D". The corresponding codeword for such symbols may be "00000000000000011110".

The distribution of the modulated symbols may be analyzed 804 and the first message may be decoded 806 based on the distribution. In the above example, the first message may be decoded 806 as "00" since there are more occurrences of the A symbol 304 than any other symbol. In one configuration, $N_1$ corresponds to the A symbol 304. Table 4 illustrates an example decoding rule for four possible first message values.

TABLE 4

Example decoding rule for messages of the first information type

| Condition | Message value |
|---|---|
| $N_1$ corresponds A | 00 |
| $N_1$ corresponds B | 01 |
| $N_1$ corresponds C | 11 |
| $N_1$ corresponds D | 10 |

In one example, a codebook associated with the second information type may be generated 808. The codebook may be generated 808 based on the decoded first message. Following the above example, the codebook based on the first message being "00" is generated. In one configuration, the codebook may be searched 810 for a codeword. The codeword may be used to decode 812 the second message. In one example, MAP or ML is used to decode the second message by searching 810 $2^b$ codewords in the generated codebook.

Figure 9:
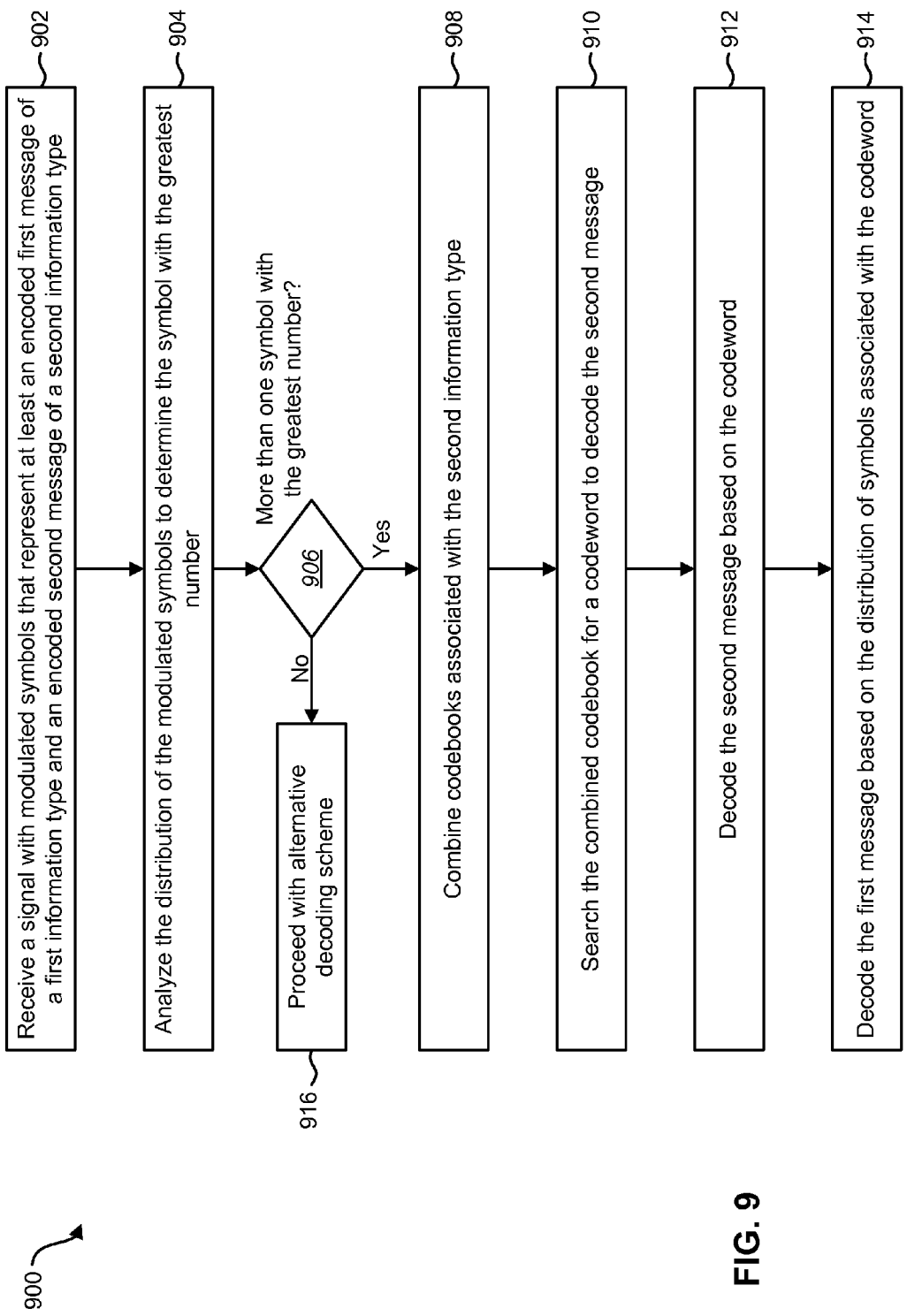
FIG. 9 is a flow diagram illustrating one example of a method for using a third decoding scheme to decode at least a first message and a second message that represent different types of information.

FIG. 9 is a flow diagram illustrating one example of a method 900 for using a third decoding scheme 536 to decode at least a first message and a second message that represent different types of information. The third decoding scheme 536 may be used when more than one symbol has the greatest number of occurrences. The method 900 may be implemented by a base station 102. In another example, the method 900 may be implemented by a user device 104.

A signal may be received 902 with modulated symbols. The modulated symbols may represent at least an encoded first message of a first information type and an encoded second message of a second information type. As previously explained, the first message may be embedded in the coding of the second message. The symbols may be interpreted as a codeword x. For example, a signal may be received 802 with the modulated symbols "7A 1B 1C 1D". The corresponding codeword for such symbols may be "00000000000000011110".

The distribution of the modulated symbols may be analyzed 904 to determine which symbol has the greatest number of occurrences. For example, if the modulated symbols included 7A, 1B, 1C, 1D, the A symbol 304 would be the symbol that has greatest number of occurrences. In one example, a decision 906 is made as to whether or not more than one symbol has the greatest number of occurrences. An example of more than one symbol having the greatest number of occurrences may be illustrated by 2A, 3B, 3C, 2D. Here, both the B symbol and the C symbol have the greatest number of occurrences (3). In other words, $N_1=N_2=3$; $N_3=N_4=2$.

If the modulated symbols do not include more than one symbol with the greatest number of occurrences, the decoding may proceed 916 with an alternative decoding scheme (such as the first decoding scheme 532 or the second decoding scheme 534). However, if the modulated symbols do include more than one symbol with the greatest number of occurrences, the number of greatest number of occurrences "e" may be counted. For example, if the distribution of symbols is 2A, 3B, 3C, 2D then $N_1=N_2=3$; $N_3=N_4=2$, and e is equal to two.

In one example, codebooks associated with the second information type may be combined 908. The number of codebooks combined may be equal to e. For example, if the distribution of symbols is 2A, 3B, 3C, 2D then the combined codebook may be $S=S_{01} \cup S_{11}$ where $S_{01}$ and $S_{11}$ are the likely codebooks corresponding to the greatest number of occurrences in the distribution of symbols (in this example, $S_{01}$ and $S_{11}$ correspond to the B symbol and the C symbol respectively). The combined codebook S may be searched 910 for a codeword. The second message may be decoded 912 based on the codeword (such as the codeword y). In one configuration, the codeword x may be decoded to reveal the second message using the above mentioned MAP or ML scheme.

In one example, the first message is also decoded 914. The symbol distribution of codeword y may be analyzed and the first message may be decoded 914 based on the distribution of the symbols associated with the codeword y. For example, if the distribution of the symbols is "1A 1B 7C 1D" the first message may be "11".

Figure 10:
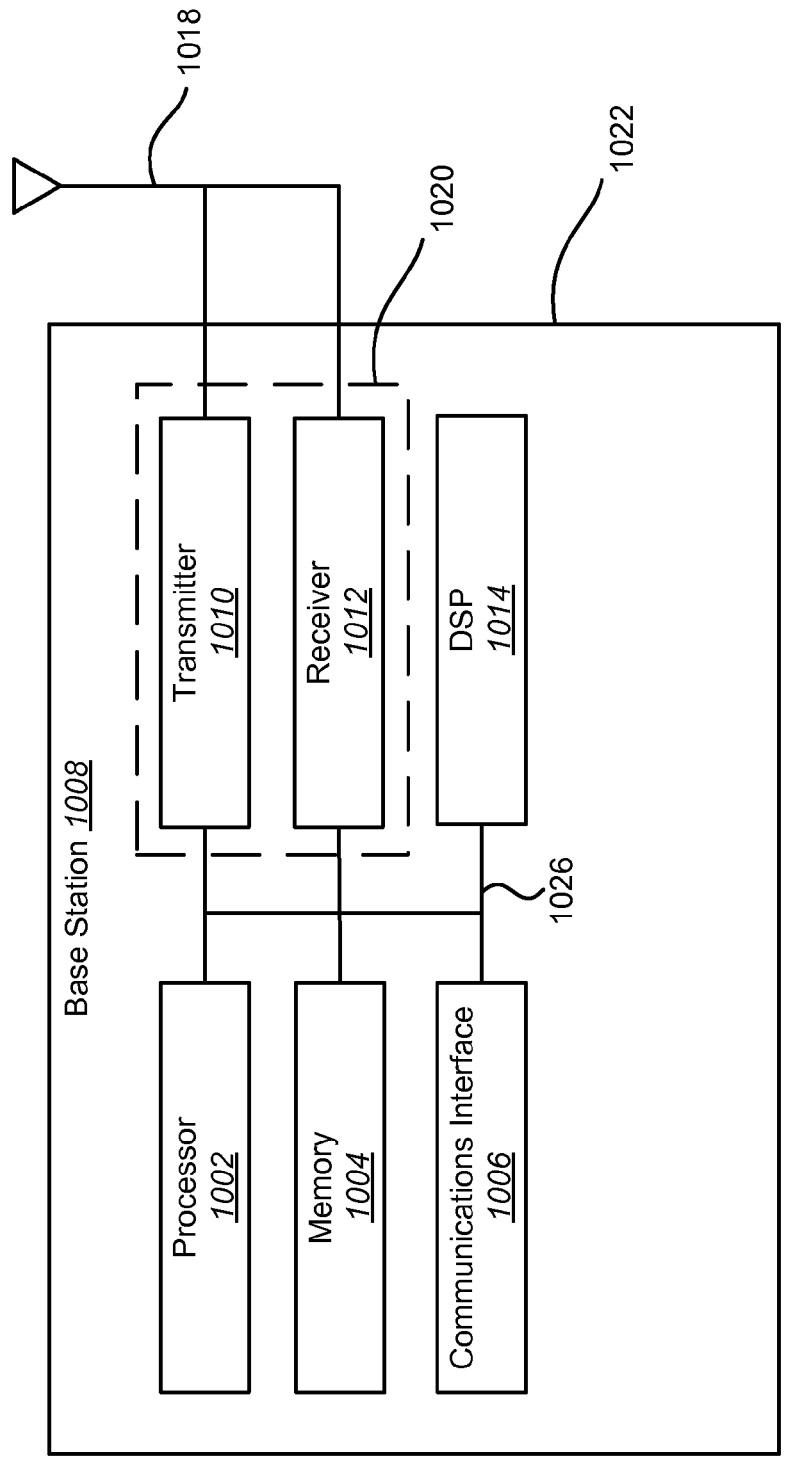
FIG. 10 illustrates various components that may be utilized in a base station.

FIG. 10 is a block diagram of a base station 1008 in accordance with one example of the disclosed apparatus. One or more base stations 1008 may be used to implement the various systems and methods disclosed herein. The base station 1008 may be a base station controller, a base station transceiver, etc. The base station 1008 includes a transceiver 1020 that includes a transmitter 1010 and a receiver 1012. The transceiver 1020 may be coupled to an antenna 1018. The base station 1008 further includes a digital signal processor (DSP) 1014, a general purpose processor 1002, a memory 1004, and a communication interface 1006. The various components of the base station 1008 may be included within a housing 1022.

The processor 1002 may control operation of the base station 1008. The processor 1002 may also be referred to as a CPU. The memory 1004, which may include both read-only memory (ROM) and random access memory (RAM), provides instructions and data to the processor 1002. A portion of the memory 1004 may also include non-volatile random access memory (NVRAM).

Figure 11:
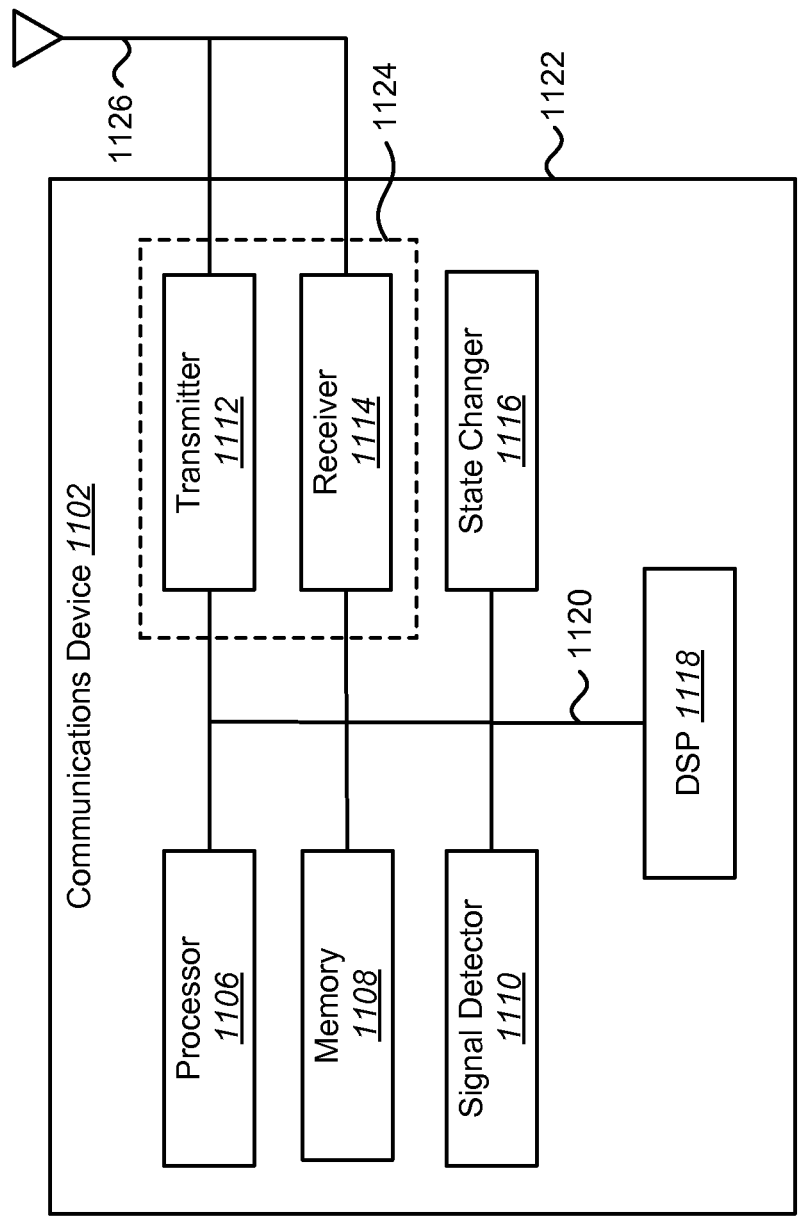
FIG. 11 illustrates various components that may be utilized in a communications device.

FIG. 11 illustrates various components that may be utilized in a communications device 1102. The communications device 1102 may include any type of communications device such as a mobile station, a cell phone, an access terminal, user equipment, etc. The communications device 1102 includes a processor 1106 which controls operation of the communications device 1102. The processor 1106 may also be referred to as a CPU. Memory 1108, which may include both read-only memory (ROM) and random access memory (RAM), provides instructions and data to the processor 1106. A portion of the memory 1108 may also include non-volatile random access memory (NVRAM).

The communications device 1102 may also include a housing 1122 that contains a transmitter 1112 and a receiver 1114 to allow transmission and reception of data. The transmitter 1112 and receiver 1114 may be combined into a transceiver 1124. An antenna 1126 is attached to the housing 1122 and electrically coupled to the transceiver 1124. Additional antennas (not shown) may also be used.

The communications device 1102 may also include a signal detector 1110 used to detect and quantify the level of signals received by the transceiver 1124. The signal detector 1110 detects such signals as total energy, pilot energy, power spectral density, and other signals.

A state changer 1116 controls the state of the communications device 1102 based on a current state and additional signals received by the transceiver 1124 and detected by the signal detector 1110. The communications device 1102 may be capable of operating in any one of a number of states.

The various components of the communications device 1102 are coupled together by a bus system 1120 which may include a power bus, a control signal bus, and a status signal bus in addition to a data bus. However, for the sake of clarity, the various buses are illustrated in FIG. 11 as the bus system 1120. The communications device 1102 may also include a digital signal processor (DSP) 1118 for use in processing signals. The communications device 1102 illustrated in FIG. 11 is a functional block diagram rather than a listing of specific components.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for selecting a decoding scheme to decode information comprising:
   receiving a codeword that comprises multiple different types of symbols, wherein the codeword represents at least a first message of a first information type embedded in a second message of a second information type;
   determining a distribution pattern of symbols included in the codeword by counting occurrences of each of the multiple different types of symbols in the codeword, wherein the distribution pattern indicates a number of occurrences for each of the different types of symbols irrespective of an order of the symbols in the codeword;
   comparing quantity of each symbol in the distribution pattern to one or more threshold settings, wherein the threshold settings include at least comparing the quantity of at least a first symbol in the distribution pattern to a quantity of one or more other symbols in the distribution pattern;
   decoding, based at least upon a comparison result, the first message;

selecting a decoding scheme based on the decoded first message;
determining if more than one symbol has a greatest number of occurrences;
if more than one symbol has a greatest number of occurrences, combining a plurality of codebooks associated with the second information type into a single codebook, wherein the plurality of codebooks may equal a number of symbols that have the greatest number of occurrences;
searching the single codebook for a decoding codeword; and
decoding the second message using the decoding codeword.

2. The method of claim 1, further comprising decoding the second message using the selected decoding scheme.

3. The method of claim 1, further comprising:
combining a plurality of codebooks into a single codebook associated with the second information type;
searching the single codebook for a decoding codeword; and
decoding the second message using the decoding codeword.

4. The method of claim 1, further comprising:
determining a codebook associated with the second information type based on the decoded first message; searching the codebook for a decoding codeword; and
decoding the second message using the decoding codeword.

5. The method of claim 1, wherein the first information type and the second information type are control signals.

6. The method of claim 5, wherein the first information type is an acknowledgement/non-acknowledgement (ACK/NACK).

7. The method of claim 5, wherein the second information type is a channel quality indicator (CQI).

8. A communications device that is configured to select a decoding scheme to decode information, the communications device comprising:
a processor;
memory in electronic communication with the processor;
instructions stored in the memory, the instructions being executable to:
receive a codeword that comprises multiple different types of symbols, wherein the codeword represents at least a first message of a first information type embedded in a second message of a second information type, wherein;
determine a distribution pattern of symbols included in the codeword by counting occurrences of each of the multiple different types of symbols in the codeword, wherein the distribution pattern indicates a number of occurrences for each of the different types of symbols irrespective of an order of the symbols in the codeword;
compare a quantity of each symbol in the distribution pattern to one or more threshold settings, wherein the threshold settings include at least comparing the quantity of at least a first symbol in the distribution pattern to a quantity of one or more other symbols in the distribution pattern;
decode, based at least upon a comparison result, the first message;
select a decoding scheme based on the decoded first message;
determine if more than one symbol has a greatest number of occurrences;
if more than one symbol has a greatest number of occurrences, combine a plurality of codebooks associated with the second information type into a single codebook, wherein the plurality of codebooks may equal a number of symbols that have the greatest number of occurrences;
search the single codebook for a decoding codeword; and
decode the second message using the decoding codeword.

9. The communications device of claim 8, wherein the instructions are further executable to decode the second message using the selected decoding scheme.

10. The communications device of claim 8, wherein the instructions are further executable to:
combine a plurality of codebooks into a single codebook associated with the second information type;
search the single codebook for a decoding codeword; and
decode the second message using the decoding codeword.

11. The communications device of claim 8, wherein the instructions are further executable to:
determine a codebook associated with the second information type based on the decoded first message; search the codebook for a decoding codeword; and
decode the second message using the decoding codeword.

12. The communications device of claim 8, wherein the first information type and the second information type are control signal types.

13. The communications device of claim 12, wherein the first information type is an acknowledgement/non-acknowledgement (ACK/NACK).

14. The communications device of claim 12, wherein the second information type is a channel quality indicator (CQI).

15. The communications device of claim 8, wherein the communications device is a base station.

16. The communications device of claim 8, wherein the communications device is a mobile station.

17. A non-transitory computer-readable medium comprising executable instructions for:
receiving a codeword that comprises multiple different types of symbols, wherein the codeword represents at least a first message of a first information type embedded in a second message of a second information type;
determining a distribution pattern of symbols included in the codeword by counting occurrences of each of the multiple different types of symbols in the codeword, wherein the distribution pattern indicates a number of occurrences for each of the different types of symbols irrespective of an order of the symbols in the codeword;
comparing a quantity of each symbol in the distribution pattern to one or more threshold settings, wherein the threshold settings include at least comparing the quantity of at least a first symbol in the distribution pattern to a quantity of one or more other symbols in the distribution pattern;
decoding, based at least upon a comparison result, the first message;
selecting a decoding scheme based on the decoded first message;
determining if more than one symbol has a greatest number of occurrences;
if more than one symbol has a greatest number of occurrences, combining a plurality of codebooks associated with the second information type into a single codebook, wherein the plurality of codebooks may equal a number of symbols that have the greatest number of occurrences;

searching the single codebook for a decoding codeword; and decoding the second message using the decoding codeword.

18. A communications device that is configured to select a decoding scheme to decode information, the communications device comprising:

means for receiving a codeword that comprises multiple different types of symbols,
wherein the codeword that represents at least a first message of a first information type embedded in a second message of a second information type;

means for determining a distribution pattern of symbols included in the codeword by counting occurrences of each of the multiple different types of symbols in the codeword, wherein the distribution pattern indicates a number of occurrences for each of the different types of symbols irrespective of an order of the symbols in the codeword;

means for comparing a quantity of each symbol in the distribution pattern to one or more threshold settings, wherein the threshold settings include at least comparing the quantity of at least a first symbol in the distribution pattern to a quantity of one or more other symbols in the distribution pattern;

means for decoding, based at least upon a comparison result, the first message;

means for selecting a decoding scheme based on the decoded first message;

means for determining if more than one symbol has a greatest number of occurrences;

if more than one symbol has a greatest number of occurrences, combining a plurality of codebooks associated with the second information type into a single codebook, wherein the plurality of codebooks may equal a number of symbols that have the greatest number of occurrences;

means for searching the single codebook for a decoding codeword; and means for decoding the second message using the decoding codeword.

* * * * *